3,148,945
MODIFIED AMMONIUM NITRATE
Edward J. Griffith, Ellisville, and Joseph G. Stites, Jr., Des Peres, Mo., assignors to Monsanto Company, a corporation of Delaware
No Drawing. Filed Mar. 9, 1959, Ser. No. 797,863
1 Claim. (Cl. 23—103)

This invention relates to ammonium nitrate. More particularly the invention relates to ways for making ammonium nitrate less hygroscopic. The invention also relates to the novel ammonium nitrate compositions produced according to the invention.

It is well known that ammonium nitrate has a relatively high degree of hygroscopicity. This hygroscopicity of ammonium nitrate gives rise to many adverse effects in the use of ammonium nitrate, not the least of which is the troublesome caking and sticking of granular or prilled ammonium nitrate.

It has now been found that the hygroscopicity of ammonium nitrate can be considerably reduced by incorporating onto the surface thereof a minor amount of ammonium carbonate. This surface treatment may be readily effected by any one or more of several techniques. One of the easiest ways to coat ammonium nitrate is to simply mechanically intermix finely pulverized ammonium carbonate with the ammonium nitrate. For example, 0.5 gram of ammonium carbonate pulverized with a mortar and pestle was shaken in a glass bottle with 50 grams of ammonium nitrate prills (average prill diameter of about $1/16$ inch). When exposed for 22 hours to an atmosphere at 25° C. having a relative humidity of 62%, this coated ammonium nitrate absorbed only about 0.58 gram of water, whereas an identical ammonium nitrate sample without the ammonium carbonate coating absorbed about 0.98 gram under the same conditions.

It will be readily recognized that the particular technique by which the ammonium carbonate is placed upon the surface of the ammonium nitrate is relatively unimportant. Other ways in which this can be done are, for example, by preparing an ammonium nitrate composition containing an excess of ammonia and thereafter exposing the composition to an atmosphere of carbon dioxide—or by exposing ammonium nitrate to a gaseous atmosphere containing both ammonia and carbon dioxide. In either of these latter situations the amount of water normally present in commercial grades of ammonium nitrate will be sufficient to react with the ammonia and carbon dioxide to form the desired surface coating of ammonium carbonate. If the necessary amount of water is not inherently present in ammonium nitrate it can be readily supplied as water vapor in the gaseous atmosphere containing the ammonia and/or carbon dioxide.

The concentration of ammonium carbonate to be utilized when practicing the present invention will depend, among other things, upon the particle or granule size of the ammonium nitrate being treated, as well as upon the degree of decreased hygroscopicity desired and the degree of dilution of ammonium nitrate (with ammonium carbonate) that can be tolerated. In general, as little as 0.1 weight percent of ammonium carbonate well distributed on the surface of the ammonium nitrate will give a noticeable decrease in hygroscopicity. On the other hand, the additional benefit per unit weight of ammonium carbonate becomes quite small and generally uneconomical above 50 weight percent of the carbonate (based on total composition). Preferred proportions of ammonium carbonate will generally run between about 0.3 and about 20 weight percent, and more preferably between about 0.5 and about 10 weight percent.

While the foregoing description has dealt with the effect of ammonium carbonate upon substantially pure ammonium nitrate, the effect of the ammonium carbonate is often much more striking with ammonium nitrate which has been admixed or combined with other materials. For example, ammonium nitrate is often admixed or combined with various other inorganic compounds such as alkali metal, alkaline earth metal or polyvalent metal sulfates, nitrates, silicates, oxides, etc., either in major or minor proportions. Examples of such compounds are potassium nitrate, sodium nitrate, calcium oxide, magnesium oxide, calcium nitrate, magnesium lead nitrate, magnesium silicate, silica, titania, zinc oxide, zinc sulfate, ferrous sulfate, aluminum silicate, and the like. Many of these compounds will actually tend to increase the hygroscopicity over that of ammonium nitrate alone. Treatment of such ammonium nitrate-containing mixtures with ammonium carbonate according to the present invention will very effectively decrease the hygroscopicity of the mixtures. For example, an ammonium nitrate composition containing about 2 weight percent of magnesium nitrate gained about 1.5 percent in weight (by absorption of moisture) when exposed for about 10 hours to an atmosphere at 25° C. and 62 percent relative humidity, whereas an identical composition coated with 1 percent by weight of pulverized carbonate gained only about 0.5 weight percent under the same conditions. Consequently, a preferred embodiment of this invention constitutes ammonium nitrate compositions containing a minor proportion, preferably between about 0.5 and about 20 percent, and more preferably between about 1.0 and about 10 percent by weight, of an inorganic compound as noted above, and coated with ammonium carbonate.

What is claimed is:

A granular solid ammonium nitrate composition consisting essentially of ammonium nitrate granules coated with between about 0.3 and about 20 weight percent of ammonium carbonate.

References Cited in the file of this patent

UNITED STATES PATENTS

| | | |
|---|---|---|
| 902,403 | Holloway | Oct. 27, 1908 |
| 1,589,237 | Scott | June 15, 1926 |
| 1,924,041 | Johnson | Aug. 22, 1933 |
| 2,041,088 | Pfirrmann | May 19, 1936 |
| 2,307,253 | Yee et al. | Jan. 5, 1943 |